United States Patent
Dean

[19]

[11] Patent Number: 5,913,477
[45] Date of Patent: Jun. 22, 1999

[54] MODULAR PLANT SUPPORT AND IRRIGATION SYSTEM

[75] Inventor: Frederic Max Dean, Mansfield, Conn.

[73] Assignees: Anthony A. Dean, Brooklyn, N.Y.; Rebecca Whitney Dean, Brookline, Mass.

[21] Appl. No.: 09/111,486

[22] Filed: Jul. 7, 1998

[51] Int. Cl.⁶ .................................................. B05B 15/00
[52] U.S. Cl. .......................... 239/289; 239/276; 239/279; 239/280; 248/87; 248/80; 248/558; 256/1; 47/45; 47/44; 47/47
[58] Field of Search .................................... 239/273, 276, 239/279, 280, 289, 548, 566; 47/44, 45, 47, 70, 86; 248/80, 87, 89, 558, DIG. 903; 256/1, 59, 65, 24; 24/324, 563, 297

[56] References Cited

U.S. PATENT DOCUMENTS

| | | |
|---|---|---|
| 3,701,477 | 10/1972 | Matt et al. . |
| 3,865,309 | 2/1975 | Greenhalgh . |
| 3,933,311 | 1/1976 | Lemelson . |
| 4,213,272 | 7/1980 | Nievelt .......................................... 47/45 |
| 4,922,653 | 5/1990 | Stone ............................................ 47/45 |
| 5,007,587 | 4/1991 | Darocca . |
| 5,480,336 | 1/1996 | Blanchard ................................. 239/279 |

*Primary Examiner*—Andres Kashnikow
*Assistant Examiner*—Dinh Q. Nguyen
*Attorney, Agent, or Firm*—Abelman, Frayne & Schwab

[57] ABSTRACT

A plant support and irrigation system for domestic and commercial use is assembled without tools from two principal interlocking components, i.e., tubular members and hubs, to form modules. Modules are joined in mating relation vertically, horizontally and/or at varying angles to construct a variety of useful plant support structures including, for example, A-frames, trellises, arbors and fences and other forms of enclosures. The horizontal and/or vertical components of the modules are optionally perforated tubing making the structures capable of providing low-pressure drip or spray irrigation for the supported plants. The assembly can include connecting members of varying angles, plugs and valved hose connections configured to securely mate with one or both ends of the tubular members.

33 Claims, 7 Drawing Sheets

MODULAR PLANT SUPPORT AND IRRIGATION SYSTEM

FIELD OF THE INVENTION

The invention relates to modular plant supporting and irrigating systems for domestic and commercial use that can be assembled from a plurality of rigid elements, where there are a relatively small number of different interchangeable elements.

BACKGROUND OF THE INVENTION

Structures for the support of food crops and decorative plants have been known since antiquity. Various combinations of poles, slats, cords and wires, as well as metal, concrete and wood structures are in use today. Some are heavy, cumbersome and expensive to produce. Others are temporary assemblages intended only to last for a season.

Several forms of "sprinkling fences" have been suggested that incorporate some desirable functions for a modular structure. All are modular in that they are assembled from repetitive elements connected horizontally. The patents to Lemelson, U.S. Pat. No. 3,933,311, and Greenhalgh, U.S. Pat. No. 3,865,309, incorporate perforated horizontal tubing as a structural element to provide irrigation. These designs, however, are limited to fencing applications and their primary object is irrigation rather than plant support. They have no vertical modularity and cannot, for example, be combined to form A-frames or arbors. They also require separate couplings or connectors for the fluid conduit members.

Those prior art structures that do present an attractive appearance, e.g., for the home gardener, are costly to manufacture and lack versatility. In a lifetime of gardening, the inventor has not found a commercially available system that combines ease of assembly, durability, versatility of configuration and function, light weight, strength, irrigation capability, attractive design and economy.

It is therefore an object of the invention to provide a modular plant support and irrigation structure that is aesthetically pleasing, that can be assembled easily and without tools and that is economical to manufacture.

It is another principal object of the invention to provide a modular plant supporting system that can be assembled and extended vertically as well as horizontally and reinforced, if necessary, to create A-frame structures, trellises, and a variety of rectilinear and curvilinear constructions in two or more planes, all of which can also serve to provide irrigation to plants in the proximity of the structure.

It is yet another important object of the invention to provide a modular plant support and low-pressure irrigation system that is assembled from elements that are durable, i.e., can be used year after year, and that is fabricated from materials that are strong but light in weight.

Another object of the invention is to provide a central supporting element, or hub, for a modular plant support system that can be produced to incorporate any of a variety of styles or designs that will be compatible with the particular architectural style of the residential or commercial setting in which the support is placed.

Other objects of the invention are to provide a new and improved plant support system that can be economically fabricated from recycled or other low-cost materials, and that is durable so that it can be disassembled and reassembled to form different structures as the need may arise and that can be easily moved from one location to another.

It is yet another object of the invention to provide a simplified coupling system by which the horizontal and vertical members are joined in a secure frictional fit making separate connectors necessary only when angled joints are to be formed.

Additional objects of the invention are to provide a system that can be manufactured in colors that will enhance or minimize the visibility of the structure as desired, and one that can be embellished with decorative, non-functional elements, if desired.

The above and such other objects and advantages that will hereafter more fully appear, are achieved by the invention comprising the novel constructions, combinations and arrangements of parts as are more fully described and illustrated below and in the accompanying drawings.

SUMMARY OF THE INVENTION

In its broadest aspects, the invention comprises a primary modular element consisting of a hub and a plurality of rigid, open-ended tubular members assembled to the hub. The tubular members can be assembled to the hub removably or permanently, and in parallel pairs and/or at right angles, that is, to form horizontal and/or vertical constructions of the primary modular elements.

The primary modular elements are joined together, horizontally and/or vertically, by inserting the end of a first tubular member assembled to a first hub into the end of a second tubular member that is assembled to an adjacent hub.

In one preferred embodiment of the invention additional tubular members are joined to the ends of the tubular members comprising the primary modular elements to extend the horizontal and/or vertical distance between the hubs. The ends of a tubular members are configured to provide a fluid-tight fit, either with or without auxiliary sealing means.

In further preferred embodiments of the invention, coupling elements are provided to permit assembly of the modular elements in intersecting planes, e.g., A-frames and trellises, and in polygonal constructions which can approximate a curvilinear configuration.

When the assembly is to be used to irrigate adjacent plantings, perforated tubular members, plugs, hose connectors and valves form part of the invention.

An optional reinforcing rod is provided that will pass in close-fitting relation through the interior of a plurality of tubular members to strengthen their joints.

The tubular members of the invention function to: (a) to support the hub when attached to it; (b) provide a means of connecting one hub to another in either a vertical or horizontal direction; (c) provide spacing between constructions of single or multiple hubs; (d) provide means for anchoring or securing the system by inserting the projecting ends into the ground; and (e) provide a means to convey water or other fluids at low pressure to the plantings supported by the hubs.

Modules consisting of a hub and two or four tubular members can be joined vertically and/or horizontally to form a number of different configurations, each appropriate to the food crop or decorative plant to be supported. When assembled, the horizontal members can be connected to a water supply to provide low-pressure (drip) irrigation.

All of the elements comprising the modular structure of the invention can be manufactured of various materials, including virgin and recycled plastics and polymers, ferrous and non-ferrous metals, as well as new materials that may be developed in the future. In a preferred embodiment of the invention, molded and/or extruded plastic is employed and the description is based on the use of polymeric materials, but is equally applicable to other materials.

Where provided, the dimensions for the various elements are illustrative only and are deemed suitable for use of the invention in domestic gardens. Larger units can also be produced for truck farms or other larger commercial farm use, while smaller units may be used to support plantings in greenhouses, deck or patio plantings and the like.

BRIEF DESCRIPTION OF THE DRAWINGS

The invention and its preferred embodiments are described with reference to the drawings in which.

DESCRIPTION OF THE PREFERRED EMBODIMENTS

Figure 1:
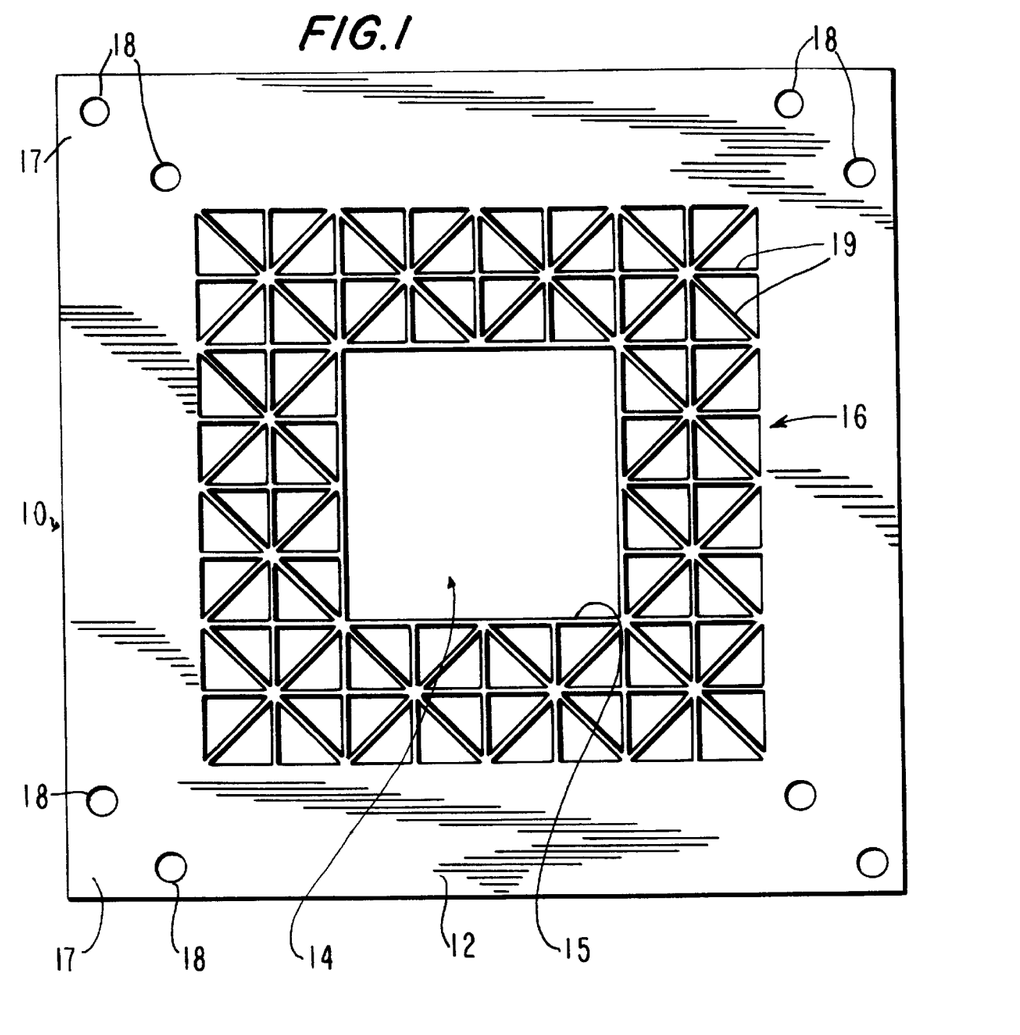
FIG. 1 is a top plan view of a hub.

With reference to FIG. 1, the hub (10) is generally planar and is constructed from a rigid material, preferably as a square or rectangle defined by a solid outer rim (12), inwardly of which is formed an integral reinforcing member (16) that surrounds a central open space (14) large enough to admit a hand to enable the harvesting of crops or flowers grown on the interior of the hub. The interior face or edge (15) of reinforcing member (16) is provided with a smooth continuous surface to avoid injury to the skin and/or the snagging of gloves or clothing coming into contact with the member. The reinforcing member (16) is provided with numerous interconnected structural elements (19) to which stems of growing plants may be tied or through which tendrils or stems can be interlaced for support. As shown in FIG. 1, the reinforcing member (16) is formed from straight elements (19) and in FIG. 8A from curvilinear or scroll work elements, and other aesthetic designs can be employed.

Figure 2:
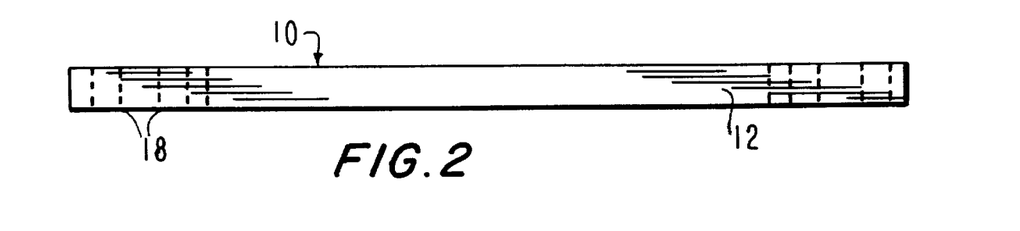
FIG. 2 is a side elevational view of the hub of FIG. 1.

Each corner (17) of the hub is provided with a plurality of openings (18) of predetermined size to receive connecting members protruding from the tubular member (20). The openings are located so that two tubular members can be attached vertically to one side of the hub and two other tubular members can be attached horizontally to the opposite side of the hub to form a module. The holes (18) are located such that each pair is equidistant vertically and horizontally so that a single tubular member (20) of uniform design having equally spaced connectors can be assembled to construct the modular elements. In a preferred embodiment as best shown in FIG. 2, the openings (18) extend through the rim (12), but openings (18) can also extend only partly through the rim to engage a connector. The hub (10) can be molded from polymers compounded to withstand the effects of UV radiation and other weathering. Compounds of polyvinylchloride polymer and copolymers have suitable properties and are in widespread use. Because the tubular members (20) serve to provide rigidity to the module, the hub (10) can be of relatively lightweight construction.

Figures 3, 4, 5A, 5B:
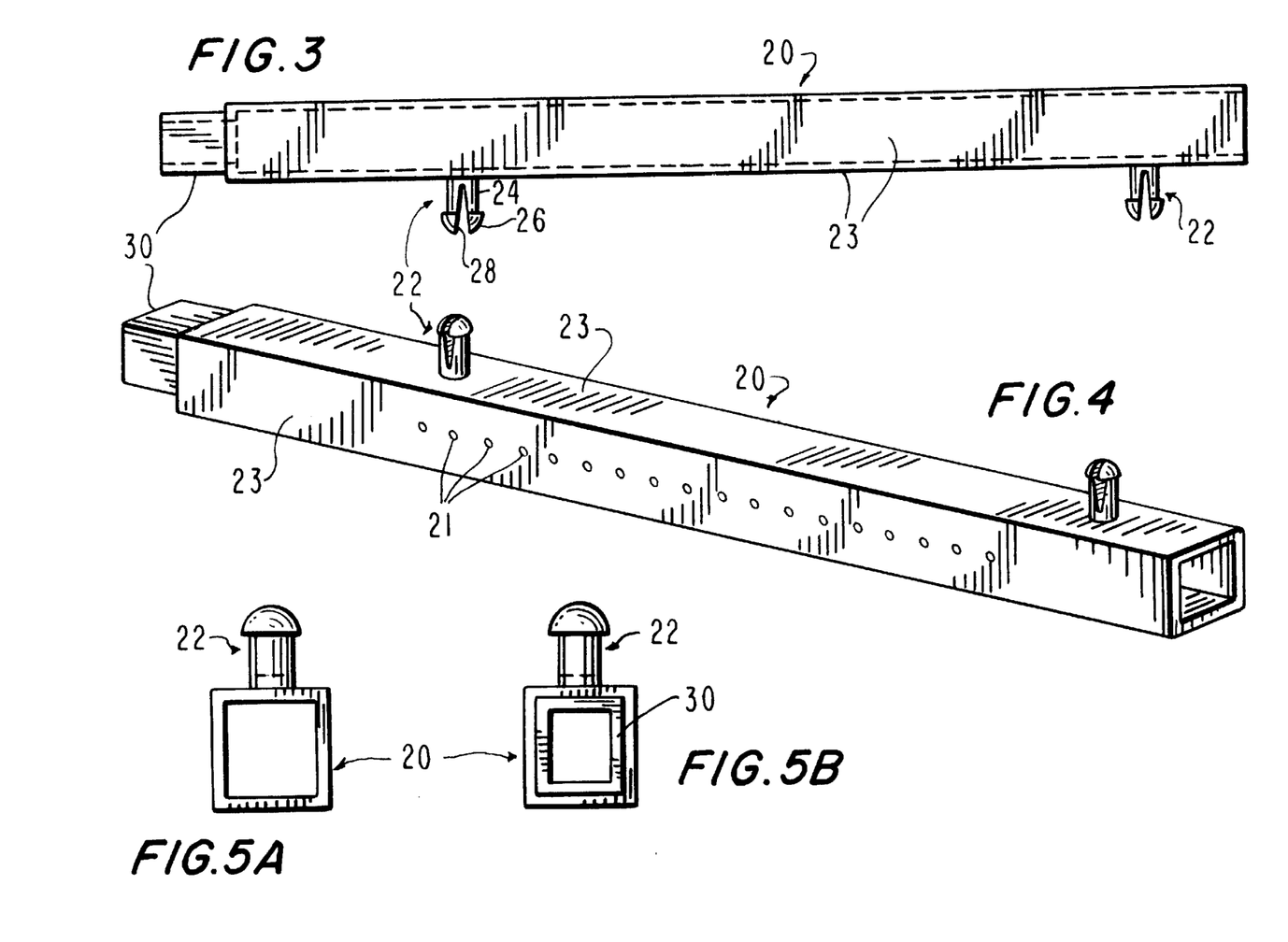
FIG. 3 is a side elevational view of a tubular member.
FIG. 4 is a side perspective view of the tubular member of FIG. 3.
FIGS. 5A and 5B are end views of the tubular member of FIG. 3.

In a preferred embodiment illustrated in FIGS. 3, 4 and 5A and 5B, the tubular members (20) are square in cross-section and have an internal configuration, or cross-section, at one end that will receive the external configuration of the opposite end in a secure and preferably fluid-tight relation. Tubular members having a circular or other desired cross-section can also be employed. This difference in cross-sectional dimensions permits the smaller end of one tubular member to be inserted into the larger end of another tubular member to form a multi-module construction. This differential in the size of the end openings can be accomplished either by tapering the tubular members or by forming an offset at the smaller end as shown in FIG. 4. In either case, the tapering or offset is dimensioned so that when two or more modules are joined there will be a secure fit and a fluid-tight seal between the end of the smaller inside tubular member and the larger outside tubular member to maintain the stability of the joint and to prevent the escape of fluid that may be conveyed at nominal pressure through the tubular members.

Figure 6:
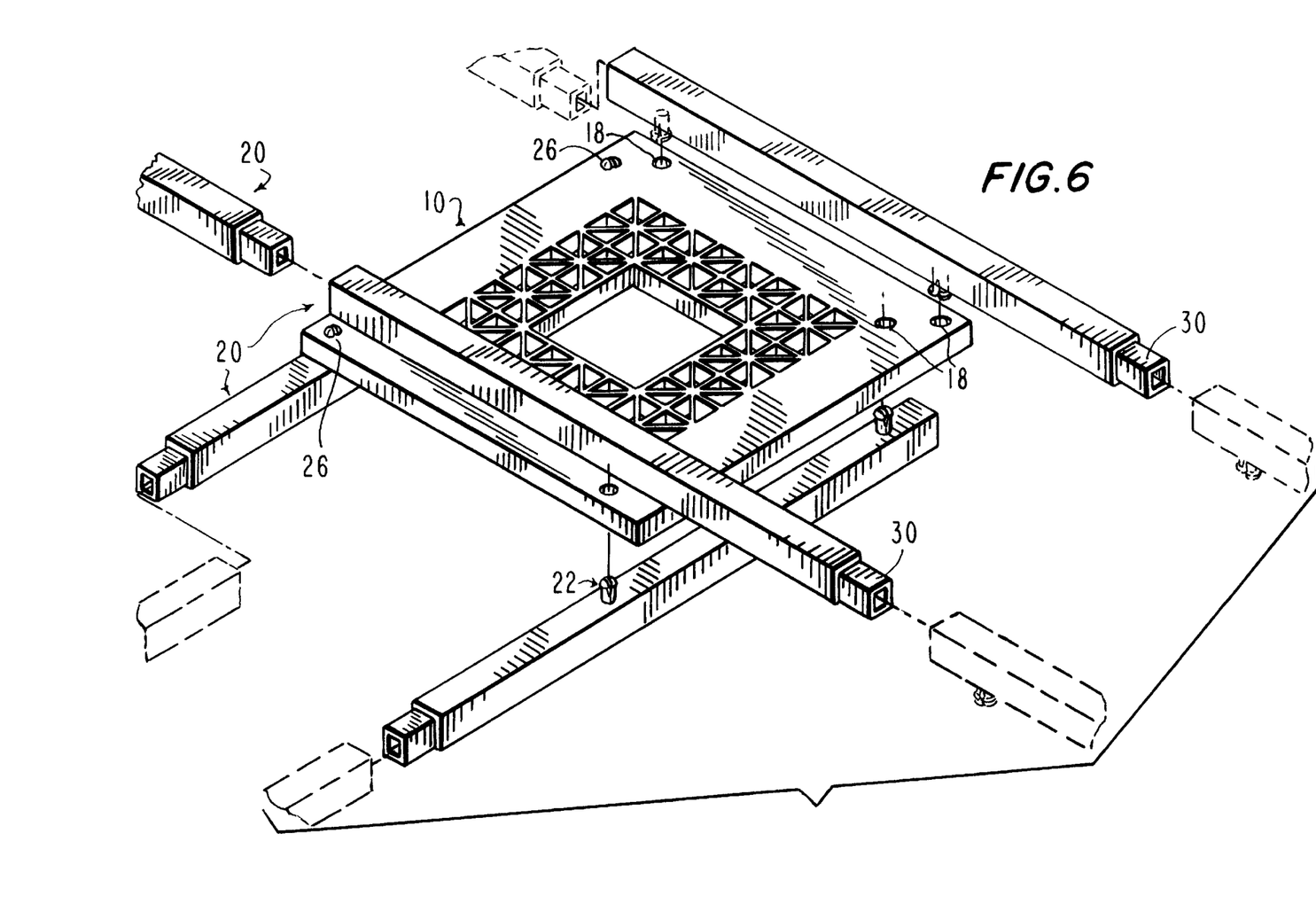
FIG. 6 is a front and side perspective exploded view of a hub and tubular members of FIGS. 1 and 2, respectively.
Figure 9:
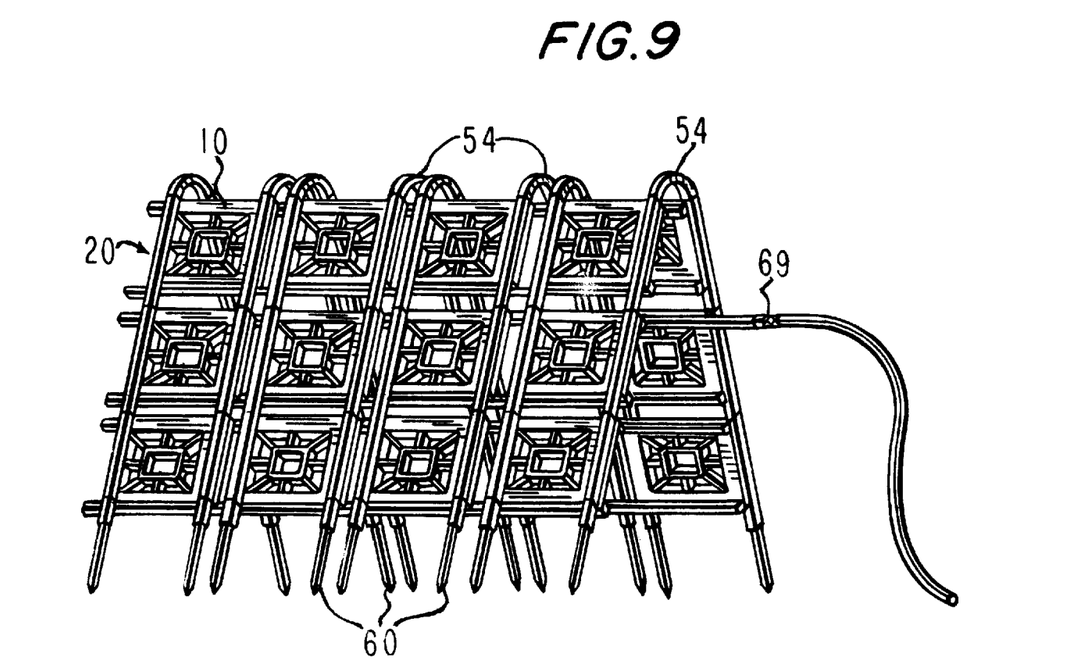
FIG. 9 is a front perspective view of a plurality of modules assembled into an A-frame construction.

In a preferred embodiment, and as illustrated in FIG. 6, one end of the tubular member extends beyond the periphery of the hub (10). For example, if the hub (10) is 12 inches on a side, the tubular member can be about 16 inches in length, with the smaller end (30) extending about 4 inches beyond the rim of the hub. These projecting ends can be inserted in the ground to anchor or stabilize the system. When assembled to hubs (10) in columns and/or rows as for example, in FIGS. 9 and 11, an open area is provided surrounding the humbs through which the gardener can reach her plants. The length of the tubular members (20) can be varied to create different spatial effects and arrangements for the asssembled system.

Figure 7:
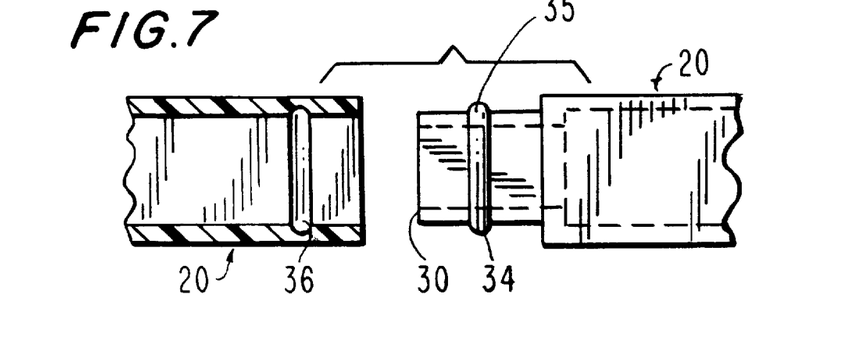
FIG. 7 is side elevational view, shown partly in section, showing auxiliary sealing means of the tubual members.

One or both ends of the tubular members can also be provided with auxiliary or supplemental sealing and/or locking means, e.g., a resilient O-ring, ridges and grooves, projections and detents, and other means that are well-known in the industrial arts for joining plastic and metal tubes. One such arrangement is illustrated in FIG. 7 where the tapered end (30) of a first tubular member (20) is fitted with an o-ring (34) in a groove (35) and the opposite end of a second tubular member (20') is molded or internally machined with a mating channel (36) to received o-ring (34).

Some or all of the tubular members are perforated along one or more sides at suitable intervals with openings (21) to disperse by drip, rather than spray, irrigation fluid introduced into the system under low pressure. In other preferred embodiments, the fluid openings (21) can be configured to produce a spray, or spray heads (not shown) can be assembled into openings at spaced locations along the length of the tubular member to provide irrigation over a greater area.

On one side or periphery of the tubular member near each end there is provided a connecting member (22) for assembling the tubular member to the hub by insertion in openings (18). In a preferred embodiment, the connecting members (22) can be molded as an integral part of the tubular member that are inserted into the receiving openings (18) in the rim (12) of the hub. These connecting members can take the form of a straight or cylindrical elements (24) that is solid or split, a ball or capped split head (28), or any other form that will securely hold the tubular member and the hub together. The connecting members have a diameter that provides a snug fit in the openings in the face of the hub. In an alternative preferred embodiment where the openings (18) do not extend through the rim of the hub, the connection can be of the ball and socket type, e.g., where a deformable ball (not shown) extending from the tubular member is pressed into a socket opening (18) in rim (12).

Figure 8A:
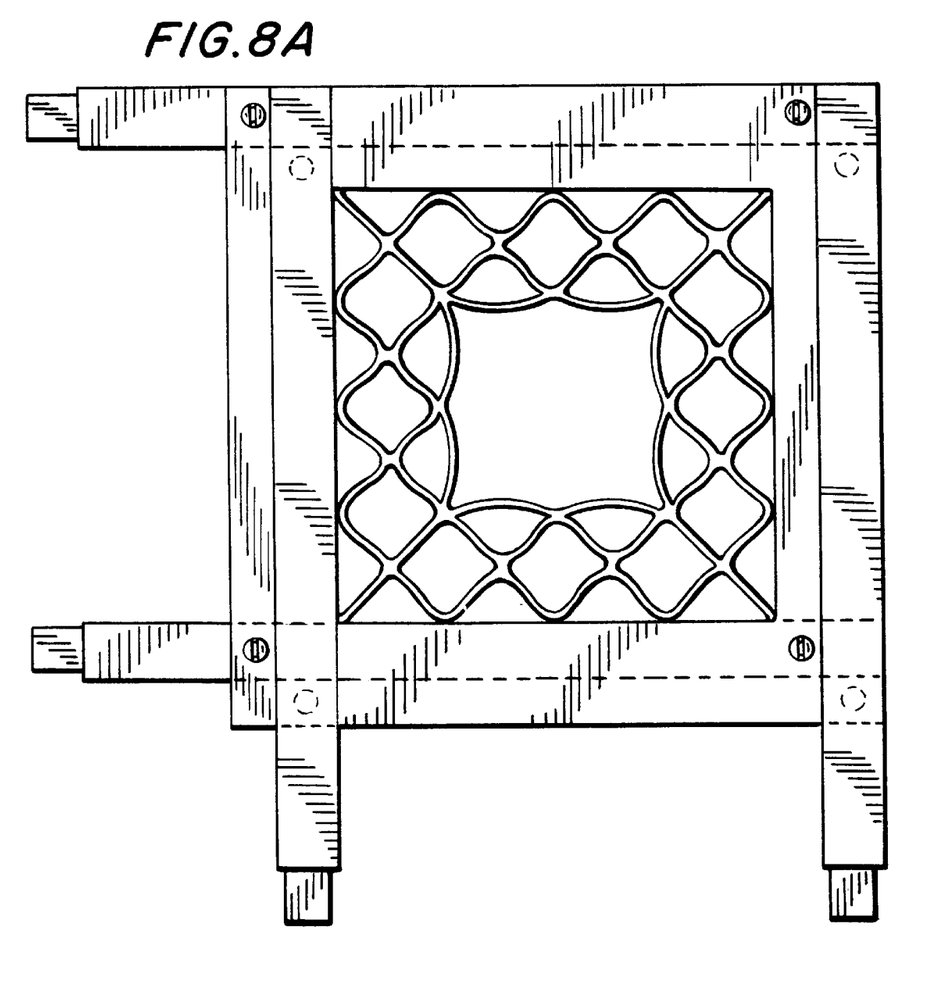
FIG. 8A is a top plan view of a hub of modified construction assembled with a plurality of tubular members to form a primary module of the invention.
Figure 8B:
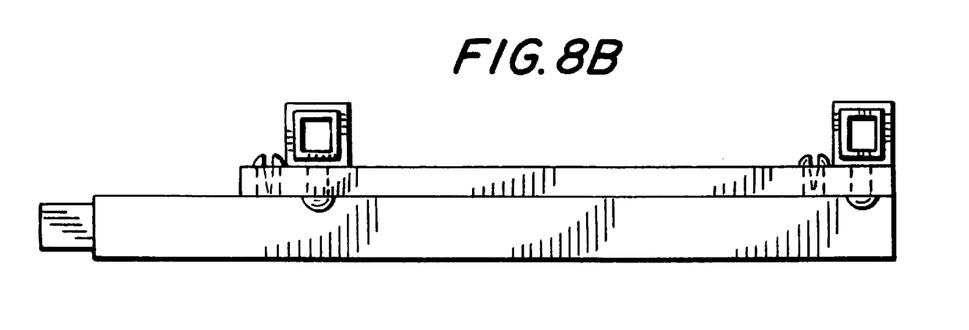
FIG. 8B is a side elevational view of the primary module of FIG. 7A.
Figure 10:
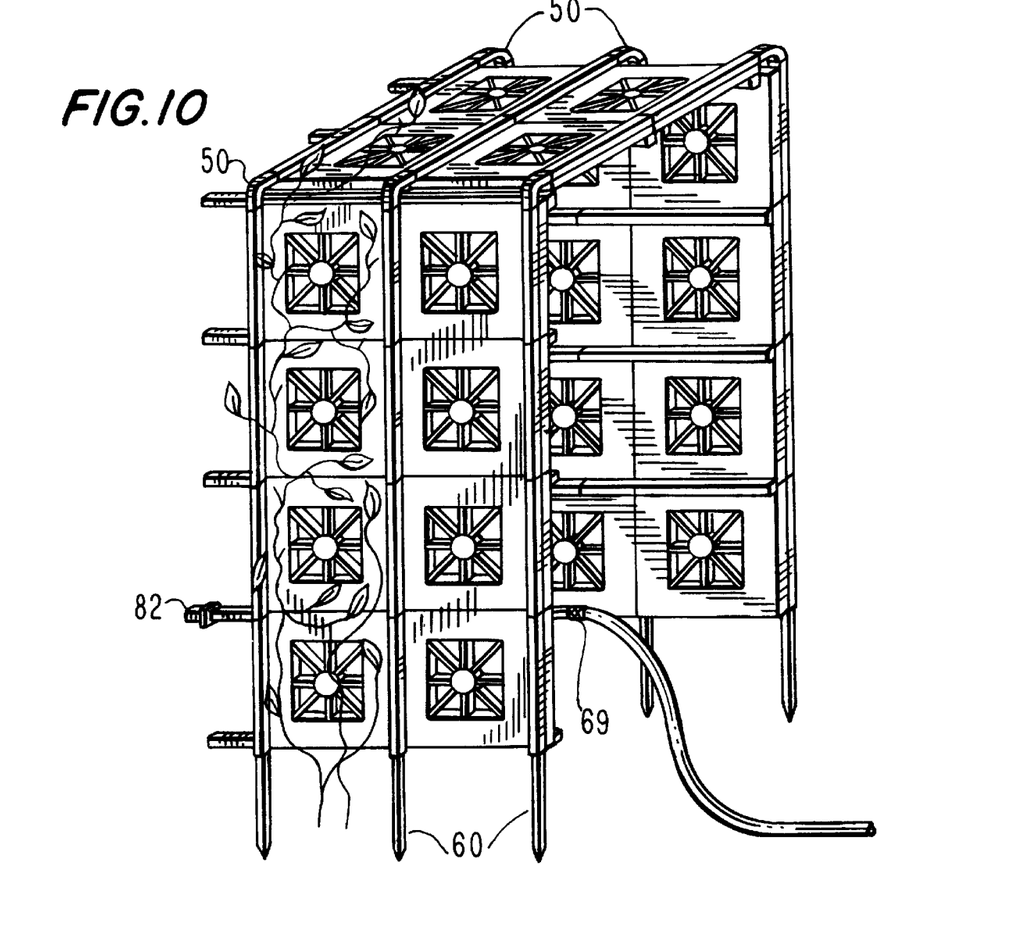
FIG. 10 is a plurality of modules of the invention assembled into a simple arbor construction.

With reference to FIG. 6, it will be seen that the assembly of two tubular members to each face of a hub provides the basic or primary module of the invention. This module can be expanded vertically by adding similar modules in a ladder-like formation. If desired, one or more tubular members can be added to extend the space between modules. By assembling two tubular members horizontally to the opposite face of the hub, as shown in FIGS. 8A and 8B, the module can be expanded horizontally by inserting the smaller ends of its horizontal tubular members into the larger ends of the tubular members of a similar module. Using coupling means of solid or tubular members bent at appropriate angles as described below, modules can be joined to create, by way of example, the A-frame or tent of FIG. 9, an arbor or trellis such as that illustrated in the variant embodiment of FIG. 10, and enclosures of various sizes and configurations as illustrated in FIG. 11.

Figure 12:
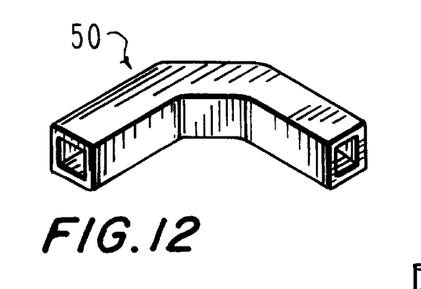
FIG. 12 is a perspective view of one preferred embodiment of a connecting member for joining a pair of tubular members.
Figure 13:
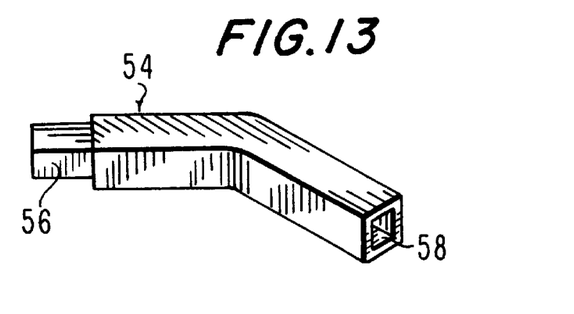
FIG. 13 is a perspective view of a second preferred embodiment of a connecting member.

Coupling means for joining two or more modules in fluid-tight relation or conjoined modules in double, or multiple plane configurations are also provided in preferred embodiments of the invention. Coupling means can include, but are not limited to, the following: (a) short tubular members (50) dimensioned to fit snugly into the larger ends of the module tubular members (20) such as that illustrated in FIG. 12, for connecting modules to form an A-frame of FIG. 9; and (b) short tubular members (54) of FIG. 13, one end (56) of which is dimensioned to fit snugly into the larger ends of the tubular members of one module and the other end (58) to fit snugly over the smaller ends of the tubular members of another module to form, for example, an arbor of FIG. 10 or enclosure of FIG. 11. The coupling means (50), (54) can be made from the same rigid material as the tubular members of the modules, in which case they are permanently bent into acute angular forms for A-frames, 90 degree angles for a square joint (such as a simple arbor) or various obtuse angles for lateral forms (such as hexagonal, octagonal or other polygonal enclosures.) If a flexible construction is desired, flexible rod or tubing of the same dimensions (not shown) can be employed.

Figures 11, 14A, 14B, 15, 16A, 16B:
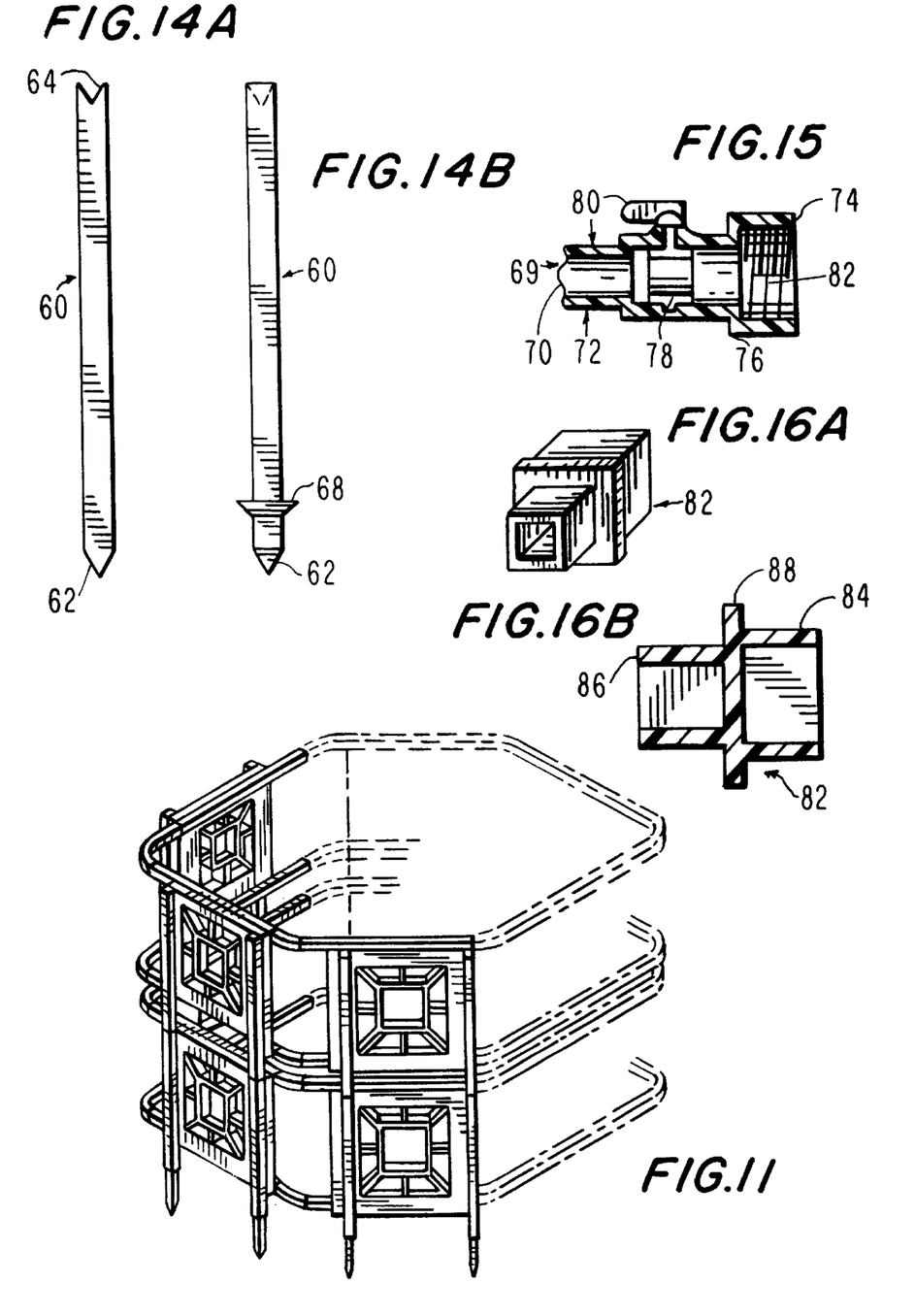
FIG. 11 is a plurality of modules assembled to form a polygonal construction.
FIGS. 14A and 14B are side elevational views of two embodiments of a reinforcing rod in accordance with the invention.
FIG. 15 is a side elevational view in cross-section of a valved hose connection member.
FIGS. 16A and 16B are plug members of the invention shown in a perspective view and a side elevational cross-section view, respectively.

When added supporting strength and rigidity are desired in configurations of two or more modules joined vertically and/or horizontally, a rod (60), such as that shown in FIG. 14A, of a round or square cross-section slightly less that the inner dimensions of the narrow ends of the tubular members can be employed. The rod can be inserted without hindrance through the tubular members of any configuration of modules in either a vertical or horizontal direction. The length of the rod (60) can be a multiple of the length of the tubular members of the module plus a suitable fraction of that length which extends from one end. If inserted vertically, the rod stabilizes the joints of the module's tubular members and protrudes from the end of the lowest module. The rod can also be inserted horizontally into one run of tubular members leaving the parallel tubular run available for irrigation. The protruding end can be fashioned in a dull point that can be thrust into the earth to anchor the construction more firmly. The opposite end of each rod is preferably provided with a cuplike recess (64) into which the point (62) will rest to provide a secure fit when more than one rod is used in the same tubular member assembly. In a further preferred embodiment shown in FIG. 14B, the rod (60) is provided with an outwardly extending flange (68) that is dimensioned to engage the smaller end of a tubular member to prevent the further passage of the rod into the tubular member. The flange is preferably proximate the tapered end (62) that is to be inserted into the ground to support the modular assembly.

To convey irrigation fluid to the horizontal tubular members of a structure of interconnected modules, a hose connection member (69) such as that schematically illustrated in FIG. 15 is provided consisting of a short length of tubing (70) of an outside dimension (72) slightly less than the inside dimension of the larger end of the tubular members of a module. The opposite end (74) of the hose connection member is formed as a standard female screw hose connector, fitted with a washer (76) as normally used. A simple valve (78), can be incorporated with an external handle (80) to regulate the flow of fluid through central passage (82).

To stop the flow or fluid and divert it through the perforations in the tubular members, a simple plug member, e.g., of molded plastic, is constructed to provide a snug fit in either the smaller or larger end of a tubular member on the module where the irrigation terminates. As shown in FIGS. 16A and 16B, a plug member (82) has a first plug end (84) configured to securely mate in fluid-tight sealing relation with the interior of a first end of a tubular member and a second plug end (86) configured to mate with exterior of the opposite end of the tubular member. A solid interior wall (88) blocks fluid flow.

It is to be understood that changes, variations and modifications may be restored to which fall within the scope of the invention as claimed.

What I claim is:

1. An improved modular plant support structure assembled from tubular members and separate connectors, where the improvement is characterized by a plurality of generally planar hub members (10), each hub member having a rigid rim (12) defining a central opening (14) and reinforcing members (16) joined to the rim and extending the central opening, the rim being provided with a plurality of spaced openings (18); and a plurality of interlocking tubular members, each having a first end formed with a modified exterior configuration that can be inserted into the opposite end of another tubular member to securely join the tubular members, each of the tubular members being provided with a plurality of connecting members (22) extending from its exterior surface for engaging an opening (18) in the rigid hub (12), whereby a plurality of the tubular members (20) assembled to a hub member (10) form a primary module and a plurality of primary modules are joined to each other to construct a plant supporting structure.

2. The invention of claim 1 where the hub member (10) is generally rectilinear.

3. The invention of claim 2 where each corner (17) of the rectilinear hub (12) has two openings in spaced relation.

4. The invention of claim 3 where the openings are spaced to permit the engagement of connecting members from at least two tubular members without interference.

5. The invention of claim 4 where the openings extend through the rim of the hub.

6. The invention of claim 5 where the connecting members are generally cylindrical and terminate in a flanged cap at their free end, which cap is adapted to pass through an opening from one side of the rigid hub and engage the surface of the rigid hub on the opposite side.

7. The invention of claim 6 where the connecting member is formed from a resilient deformable material and the flange of the cap deforms to pass through the opening in the rigid hub.

8. The invention of claim 6 where the connecting member is made of resilient material and the flanged cap and adjacent cylinder are formed with at least one groove along the axis of the cylinder.

9. The invention of claim 1 where the hub members are formed from molded plastic.

10. The invention of claim 9 where the reinforcing members are formed integrally with the rim.

11. The invention of claim 1 where the reinforcing members (16) are formed from a plurality of intersecting rectilinear elements (17).

12. The invention of claim 1 where the reinforcing members (16) are formed from a plurality of intersecting curvilinear elements.

13. The invention of claim 1 where the reinforcing members (16) extend only partially into the central opening (14).

14. The invention of claim 13 where the reinforcing members define an opening through which a hand can pass.

15. The invention of claim 1 where the joined ends of the tubular members form a water-tight seal.

16. The invention of claim 15 which further comprises auxiliary sealing means at the ends of the tubular members.

17. The invention of claim 16 where the auxiliary sealing means are an o-ring and grooves.

18. The invention of claim 15 where at least one of the plurality of tubular members is perforated to permit the passage of water from the interior of the tubular member in the form of drops or a spray.

19. The invention of claim 1 where the tubular members are molded plastic and are formed with an interior tapered wall at a first end and with and exterior tapered wall of reduced size at the opposite end, whereby the tapered opening at the first end of one member receives in securely fitting relation the exterior tapered opposite end of another tubular member.

20. The invention of claim 19 where the hub members are molded plastic.

21. The invention of claim 20 where the hub and tubular members are molded colored plastic.

22. The invention of claim 20 where the plastic is selected from polyvinyl chloride and copolymers of polyvinyl chloride.

23. The invention of claim 1 where the tubular members are of rectilinear cross-section.

24. The invention of claim 1 where the tubular members are of round cross-section.

25. The invention of claim 1 which further comprises one or more coupling means for joining the ends of two or more tubular members in secure rigid relation.

26. The invention of claim 25 where the one or more coupling means joins the tubular members at an angle ranging from about 30° to about 120°.

27. The invention of claim 25 where one or more of the coupling means is a fluid conduit and forms a fluid-tight seal with the mated ends of the tubular members.

28. The invention of claim 1 which further comprises a plug member having a first plug end configured to securely mate in fluid-tight sealing relation with the interior of a first end of the tubular member and a second plug end configured to securely mate in fluid-tight sealing relation with the exterior of the opposite end of the tubular member.

29. The invention of claim 1 which further comprises a hose connection member having a central fluid passage, a first end configured to securely mate in fluid tight sealing relation with and end of a tubular member and a second end configured with female threads for mating with the male threaded end of a garden hose.

30. The invention of claim 29 which further comprises a valve member mounted in the fluid passage intermediate the ends of the hose connection member and external valve control means extending through a wall of the hose connection member for controlling fluid flow through the hose connection member.

31. The invention of claim 1 which further comprises at least one internal reinforcing rod, said rod having a cross-section corresponding to the minimum cross-section of the tubular members, whereby when said rod is inserted into a plurality of tubular members joined end-to-end said structure is reinforced.

32. The invention of claim 31 where a first end of at least one reinforcing rod is recessed and the opposite end is tapered, whereby the first end of a reinforcing rod receives the tapered end of another rod in mating relation.

33. The invention of claim 32 where the at least one reinforcing rod further comprises an outwardly extending flange proximate the tapered end to engage the end of a tubular member, whereby the flange prevents the further passage of the rod into the tubular member.

* * * * *